(12) United States Patent
Zhang et al.

(10) Patent No.: US 12,144,363 B2
(45) Date of Patent: Nov. 19, 2024

(54) METHOD FOR PREPARING CORDYCEPS MILITARIS FERMENT BY TWO-STAGE FERMENTATION AND COMPLEX ENZYMATIC HYDROLYSIS

(71) Applicant: JIANGNAN UNIVERSITY, Jiangsu (CN)

(72) Inventors: Min Zhang, Jiangsu (CN); Yanyan Lao, Jiangsu (CN); Wuxiong Yang, Jiangsu (CN); Sifu Yi, Jiangsu (CN); Lihua Hou, Jiangsu (CN); Xiaoling Guo, Jiangsu (CN)

(73) Assignee: JIANGNAN UNIVERSITY, Jiangsu (CN)

( * ) Notice: Subject to any disclaimer, the term of this patent is extended or adjusted under 35 U.S.C. 154(b) by 638 days.

(21) Appl. No.: 17/426,104

(22) PCT Filed: Dec. 6, 2019

(86) PCT No.: PCT/CN2019/123518
§ 371 (c)(1),
(2) Date: Jul. 28, 2021

(87) PCT Pub. No.: WO2020/177421
PCT Pub. Date: Sep. 10, 2020

(65) Prior Publication Data
US 2022/0151265 A1    May 19, 2022

(30) Foreign Application Priority Data
Mar. 1, 2019  (CN) .......................... 201910156395.7

(51) Int. Cl.
*A23L 2/84* (2006.01)
(52) U.S. Cl.
CPC ....................................... *A23L 2/84* (2013.01)
(58) Field of Classification Search
CPC ....................................................... A23L 2/84
See application file for complete search history.

(56) References Cited

FOREIGN PATENT DOCUMENTS

| | | |
|---|---|---|
| CN | 105166907 | 12/2015 |
| CN | 105961955 | 9/2016 |
| CN | 107213194 | 9/2017 |
| CN | 107509901 | 12/2017 |
| CN | 107927497 | 4/2018 |
| CN | 107951011 | 4/2018 |
| CN | 108208811 | 6/2018 |
| CN | 108244432 | 7/2018 |
| CN | 108450826 | 8/2018 |
| CN | 109717340 | 5/2019 |
| IN | 108142765 | 6/2018 |

OTHER PUBLICATIONS

Fan et al. CN 108576797 Sep. 28, 2018 (Year: 2018).*
"International Search Report (Form PCT/ISA/210) of PCT/CN2019/123518," mailed on Mar. 9, 2020, with English translation thereof, pp. 1-4.
"Written Opinion of the International Searching Authority (Form PCT/ISA/237) of PCT/CN2019/123518," mailed on Mar. 9, 2020, pp. 1-5.

* cited by examiner

*Primary Examiner* — Felicia C Turner
(74) *Attorney, Agent, or Firm* — JCIP GLOBAL INC.

(57) ABSTRACT

The present application belongs to the technical field of research and development of fermented beverages, and a method for preparing *Cordyceps militaris* ferment by two-stage fermentation and complex enzymatic hydrolysis is provided. The present application involves preparation of a *Cordyceps militaris* powder and a Cordyceps militaris slurry, preparation of a *Cordyceps militaris* fermentation substrate, lactic acid bacteria fermentation in combination with complex enzymatic hydrolysis, and yeast fermentation, followed by centrifugation, filtration, formulation, sterilization, and filling to obtain a product. By employing lactic acid bacteria fermentation in combination with complex enzymatic hydrolysis, and secondary fermentation by yeast, the present application can quickly finish a whole fermentation process in 2 to 3 days.

18 Claims, No Drawings

METHOD FOR PREPARING CORDYCEPS MILITARIS FERMENT BY TWO-STAGE FERMENTATION AND COMPLEX ENZYMATIC HYDROLYSIS

CROSS-REFERENCE TO RELATED APPLICATION

This application is a 371 of international application of PCT application serial no. PCT/CN2019/123518, filed on Dec. 6, 2019, which claims the priority benefit of China application no. 201910156395.7, filed on Mar. 1, 2019. The entirety of each of the above mentioned patent applications is hereby incorporated by reference herein and made a part of this specification.

BACKGROUND

Technical Field

The present application relates to a method for preparing *Cordyceps militaris* ferment by two-stage fermentation and complex enzymatic hydrolysis, and in particular to a quick fermentation method by using brown sugar as a carbon source, employing complex enzymatic hydrolysis to promote lactic acid bacteria fermentation and then inoculating yeast to carry out secondary fermentation, which belongs to the technical field of research and development of fermented beverages.

Description of Related Art

*Cordyceps militaris* is a parasitical fungi, which was listed as a new resource food in 2009. It contains a variety of nutritional components such as proteins, amino acids, Cordyceps polysaccharide, cordycepic acid (D-mannitol), cordycepin and superoxide dismutase (SOD). The records in ancient books and modern studies show that, *Cordyceps militaris* is similar to *Cordyceps sinensis* with respect to the medicinal value, and can rival radix ginseng and cornu cervi pantotrichum. Its unique cordycepin can serve as a nucleoside analogue to disrupt the synthesis of DNA and RNA, thereby causing the apoptosis of cancer cells, and has multiple physiological functions such as anti-tumor, blood sugar decreasing, immunomodulatory, bacteriostatic and anti-inflammatory effects.

In China, *Cordyceps militaris,* as an edible fungi, is eaten fresh. For example, it is often cooked for soup in a daily household diet. Fresh *Cordyceps militaris* is hard to preserve as "white mildew" is likely to grow and browning easily occurs when it is exposed to air. If fresh *Cordyceps militaris* fruiting bodies are properly dried or processed, the storage life of *Cordyceps militaris* can be prolonged, and the nutritional components can be preserved, thereby greatly enhancing the application value of *Cordyceps militaris*. At present, a great variety of products are processed by taking *Cordyceps militaris* as a raw material, such as *Cordyceps militaris* lozenges, bread, cans, salted pork, beverages and *Cordyceps militaris* wine; and the *Cordyceps militaris* products have a broad development prospect because of a high nutritional value and a unique flavor.

With the economic development and the growth in the living standard, people's health care consciousness is growing gradually, and a healthy, nutritional and delicious beverage is becoming a new favorite of consumers. Ferment is a novel fermented beverage which originates from Japan and is a microbial preparation that is generally prepared by fermenting the raw materials such as vegetables, fruits, grains, beans, medicinal and edible fungi and Chinese herbs using the probiotics such as lactic acid bacteria, yeast and acetic acid bacteria, and contains the nutrients such as multiple enzymes, vitamins, trace elements, esters and polyphenols. Studies show that ferment has the healthcare functions of preventing obesity, resisting oxidation and aging, promoting cell regeneration, enhancing immunity, etc., and is very popular in Europe and America, Japan and Taiwan area of China. Although a few ferment products are available in the Chinese market, these ferment products require a long fermentation time and are uneven in quality. Therefore, there is still a broad development space for the ferment industry in China.

Guo Honglian, et al. (2018) adopt dried wolfberry as a raw material for natural fermentation in a sealed environment for 45 d using the multiple inherent probiotics of wolfberry, to obtain a wolfberry ferment containing the flavor substances such as esters, aldehydes, ketones, alcohols, acids and aromatic heterocycles and having relatively strong oxidation resistance. Although natural fermentation achieves a good flavor and relatively strong oxidation resistance for the product, the fermentation time is long, the requirements on the production conditions are high, and the product quality is difficult to control. By comparison, the present application, by employing inoculated fermentation, greatly improves the fermentation efficiency, shortens the fermentation time, and can finish the whole fermentation process in 2-3 d; and the *Cordyceps militaris* obtained is sweet and sour, has a good taste and preserves cordycepin well, which is a unique functional component of *Cordyceps militaris*.

Liu Qin, et al. disclose a "Method for Preparing Chinese-Wolfberry Lemon-Fruit Pomelo-Peel Ferment" (Chinese Patent Application No. 201611136927.3), which includes: washing Chinese wolfberry, lemonfruits and pomelo peel at a certain ratio; drying in the air, then dicing and putting into a fermentation tank; adding a certain amount of brown sugar and honey to submerge the fruits; stirring well; and natural fermentation in a sealed environment, where the fermentation time is 30-40 days. The raw materials such as pomelo peel and lemonfruits used in the method contain a high amount of cellulose and pectin, and are difficult to be decomposed and utilized by common probiotics. As a result, for the ferment produced by the method, the fermentation period is long, and the nutritional components are hard to dissolve effectively. By comparison, the present application, by employing inoculated fermentation in combination with enzymatic hydrolysis, can decompose the macromolecular substances in *Cordyceps militaris,* promote the utilization by probiotics and realize sufficient dissolution of the nutritional components in *Cordyceps militaris,* thereby improving the fermentation efficiency, and shortening the fermentation time; and the obtained product has a good flavor and rich nutrition.

Liu Zhongcheng, et al. disclose a "Method for Preparing *Cordyceps Militaris* Compound Ferment Beverage with Fatigue Resisting and Immunity Enhancing Effects" (Chinese Patent Application No.: 201810158350.9), which includes: subjecting the Chinese herbs such as radix ginseng, maca, rhizoma polygonati, fructus lycii and radix puerariae to the steps such as soaking, decocting, concentration, sterilization and filtration to obtain a nutrient solution; then adding brown sugar and uniformly mixing to obtain a culture solution; and finally, adding *Cordyceps militaris* powder, inoculating rhizopus oryzae and red yeast rice strains, and fermenting in a sealed environment for 3-6 months to obtain a product. The *Cordyceps militaris* compound ferment beverage prepared by the method is rich in nutrients and has multiple healthcare functions; and by inoculating rhizopus oryzae and red yeast rice bacteria for complex fermentation, the toxic and harmful substances in the raw materials are degraded. However, the method does not employ an enzymatic hydrolysis technology, resulting in reduced fermentation efficiency and increased fermentation time. By comparison, the present application adopts both a two-stage inoculated fermentation technology and a combination of complex enzymatic hydrolysis and lactic acid bacteria fermentation, further improving the fermentation efficiency of lactic acid bacteria, such that a high-quality *Cordyceps militaris* ferment product can be quickly prepared.

Lu Liqun, et al. disclose a "Method for Preparing Barley Seedling Ferment through Quick Fermentation" (Chinese Patent Application No.: 201510653100.9). In the method, a barley seedling homogenate subjected to auxiliary material blending and sterilization is fermented by means of artificial yeast inoculation, such that the whole fermentation process is finished in only 12 h, and a barley seedling ferment with high enzyme activity and relatively strong oxidation resistance is obtained. However, since only yeast is used for fermentation, the mouthfeel of the obtained product is not good enough although the process is simplified. By comparison, the present application, by adopting a way of fermenting with lactic acid bacteria and then yeast and using simple raw materials and a convenient process, quickly finishes the whole fermentation process and effectively preserves the nutritional components, to obtain a ferment product with good mouthfeel and rich nutrition.

Wang Yong, et al. disclose a "*Cordyceps Militaris* Beverage Capable of Improving Body Immunity and Preparation Method thereof" (Chinese Patent Application No.: 201610097996.1), in which the raw materials such as fresh premna microphylla leaves, *Cordyceps militaris*, Chinese rose petal powder, Chinese rose powder, radix ginseng rubra, Chinese wolfberry fruits, yeast and protease are used. Although the patent employs the enzymatic hydrolysis and inoculated fermentation technology, due to a wide variety of raw materials used, the fermentation period is still long, requiring 22-24 d of fermentation at 28-30° C. By comparison, the present application adopts simple raw materials and improves the process by simultaneous complex enzymatic hydrolysis and lactic acid bacteria fermentation followed by yeast fermentation, to finish the whole fermentation process in just 2-3 d and obtain a product of a unique flavor and rich nutrition.

Jiang Xiaolu, et al. disclose a "Method for Producing *Cordyceps Militaris* Ferment based on Enzymolysis-Fermentation Coupling" (Chinese Patent Application No.: 201711263212.9), which adopts *Cordyceps militaris* mycelia or *Cordyceps militaris* powder as a raw material and employs combined enzymolysis for 2 h and then inoculating lactobacillus plantarum for coupled fermentation for 12-48 h, to obtain a liquid *Cordyceps militaris* ferment product. Xu Guohua, et al. disclose a "Method for Preparing *Cordyceps Militaris* Fruit and Vegetable Ferment" (Chinese Patent Application No.: 201810085470.0), which includes: dissolving *Cordyceps militaris* powder in water, adding 1-2% of chitinase for enzymolysis, and then concentrating; after that, mixing the obtained *Cordyceps militaris* concentrate with a fruit and vegetable juice added with maltitol and xylitol at a ratio of 1:(3-5); and inoculating seven kinds of lactic acid bacteria of *Bifidobacterium adolescentis, Lactobacillus casei, Lactobacillus acidophilus, Streptococcus thermophilus, Lactobacillus rhamnosus, Lactobacillus plantarum* and *Lactobacillus bulgaricus* at an inoculation amount of 3.5-7%, and fermenting for 4-6 days to obtain a product. Zhang Furong, et al. disclose a "Fermented *Cordyceps Militaris* Probiotic Beverage and Preparation Method thereof" (Chinese Patent Application No.: 201810069589.9), which includes using *Cordyceps militaris* powder as a main raw material, adding ganoderma lucidum powder, selenium-enriched yeast powder, soybean protein powder, a chrysanthemum flower extract and a Chinese wolfberry fruit extract, and mixing to obtain a stock solution; then performing enzymatic hydrolysis on the stock solution using α-amylase, glucoamylase, cellulase, pectinase and protease, to obtain a pretreated stock solution; then inoculating four probiotics of *Bifidobacterium adolescentis, Lactobacillus paracasei, Lactobacillus rhamnosus* and *Lactobacillus acidophilus* at an inoculation amount of 4-6%; and adding 5-20% of xylitol and fermenting for 40 h at a constant temperature of 37° C. to obtain a product. The above-mentioned methods all adopt a process of enzymatic hydrolysis on the stock solution and then fermentation, while the first stage of fermentation of the present application adopts a way of simultaneous enzymatic hydrolysis and fermentation, thereby minimizing the processing time on the basis of maintaining the product quality. In addition, although the raw materials used are simple, the present application performs two-stage fermentation by inoculating lactic acid bacteria and then yeast, thereby adding a mellow aroma to the ferment product and achieving a better flavor than the ferment prepared by the one-stage fermentation; and also, a process of preparing other Chinese herb or fruit and vegetable treatment solution is omitted, thereby saving the cost.

SUMMARY

Technical Problem

An objective of the present application is to provide a method for preparing *Cordyceps militaris* ferment by two-stage fermentation and complex enzymatic hydrolysis, which employs the processes such as lactic acid bacteria fermentation in combination with complex enzymatic hydrolysis, yeast fermentation and the like, and can quickly finish the whole fermentation process, thereby greatly shortening the fermentation period. Both the raw materials and processes adopted by the method are very simple. Since only *Cordyceps militaris* powder is adopted as a raw material without adding additional fruits and vegetables or Chinese herbs, and brown sugar is used as a carbon source for the fermentation process, the cost is relatively low; and the product obtained is sweet and source, has a good taste and a unique flavor, has a good suspension stability, and can preserve cordycepin well which is an important functional component, thereby having a certain promotional value.

Technical Solution (1) Preparation of a *Cordyceps militaris* powder and a *Cordyceps militaris* slurry: after impurity removal of a dry sample of *Cordyceps militaris*, pulverizing with a high-speed pulverizer at a motor speed of 34,000 r/min, and screening with a 100-mesh sieve, to obtain the *Cordyceps militaris* powder; dissolving the *Cordyceps militaris* powder with water at a mass ratio of 1:(10-15), and intermittently stirring for 1-2 min with a high-speed homogenizer at a speed of 3,000-3,600 r/min to achieve uniform mixing, to obtain the *Cordyceps militaris* slurry, wherein the duration of each stirring does not exceed 10 s;

(2) preparation of a *Cordyceps militaris* fermentation substrate: wherein based on a total mass of the *Cordyceps militaris* fermentation substrate, 30-40% of the total mass is the *Cordyceps militaris* slurry obtained in Step (1), 10-20% of the total mass is brown sugar as a carbon source for fermentation, and the rest being distilled water; and performing pasteurization treatment on the prepared *Cordyceps militaris* fermentation substrate;

(3) lactic acid bacteria fermentation in combination with complex enzymatic hydrolysis: cooling the sterilized *Cordyceps militaris* fermentation substrate to 40-45° C., and adjusting the pH to 4.80-5.00 using a citric acid solution; wherein based on the total mass of the *Cordyceps militaris* fermentation substrate, adding 0.4-0.6% cellulase and 0.4-0.6% pectinase; inoculating 0.1-0.2% lactic acid bacteria on the fermentation substrate, and performing complex enzymatic hydrolysis and the enzymatic hydrolysis and fermentation of the lactic acid bacteria at the same time at 40-45° C. for 36-48 h; and then inactivating the enzymes for 5-10 min in a water bath at 85-90° C., to obtain a fermentation broth;

(4) fruit wine yeast fermentation: cooling the fermentation broth obtained in Step (3) to 28-32° C., then inoculating 0.10-0.15% (w/w) of fruit wine yeast, and fermenting for 6-18 h at a constant temperature of 26-30° C.;

(5) centrifugation: centrifuging the *Cordyceps militaris* fermentation broth subjected to two-stage fermentation by lactic acid bacteria and fruit wine yeast for 10 min at 4,200 r/min, and then filtering to obtain a clear liquid;

(6) formulation: adding a stabilizer into the clear liquid obtained by the centrifugation of Step (5); and (7) sterilization and filling: sterilizing the formulated fermentation broth for 5-10 min at 95-100° C., cooling to 85-90° C., and filling in a pre-sterilized glass bottle while the fermentation broth is hot, to obtain a *Cordyceps militaris* ferment product.

In Step (2), the temperature for the pasteurization is 80-90° C., and the time is 10-20 min.

In Step (3), the concentration of the citric acid solution is 10% (w/w); the enzyme activity of the cellulase is 50,000 U/g, and the enzyme activity of the pectinase is 100,000 U/g; and an appropriate temperature for enzymatic hydrolysis is 40-50° C.

In Step (3), the inoculation process of the lactic acid bacteria is finished in a super clean bench; the lactic acid bacteria are a fermented powder of probiotics, including *Lactobacillus plantarum, Lactobacillus acidophilus, Bifidobacterium lactis, Lactobacillus casei* and *Bifidobacterium longum;* and the bacterial number reaches 8 billion CFU/g, and an appropriate temperature for growth is 37-45° C.

In Step (4), the inoculation process of the fruit wine yeast is finished in a super clean bench; the fruit wine yeast is a "special yeast powder for wine and fruit wine"; and the fruit wine yeast requires activation in warm water at 35-40° C. before use, and then is inoculated into the fermentation broth at 26-30° C.

The stabilizer is a compound stabilizer of xanthan gum and sodium carboxymethyl cellulose CMC-Na, wherein the total addition amount of the stabilizer is 0.10-0.20% (w/w), and the compounding ratio of xanthan gum to CMC-Na is 2:1.

Advantageous Effect

1. Compared with natural fermentation, the present method, by employing inoculated fermentation, greatly improves the fermentation efficiency, shortens the fermentation time, and obtains a product with a unique flavor and rich nutrition;

2. compared with enzymatic hydrolysis and then fermentation, the present method performs enzymatic hydrolysis and the first stage of fermentation at the same time, thereby simplifying the process to the greatest extent and shortening the processing time on the basis of guaranteeing the enzymatic hydrolysis effect and the fermentation quality;

3. compared with one-stage fermentation, the present method employs two-stage fermentation by inoculating lactic acid bacteria and then yeast, thereby enriching the product flavor and achieving good mouthfeel of the *Cordyceps militaris* ferment without adding other fruit and vegetable raw materials; and 4. to sum up, by adopting the present fermentation process, the operation is simple and practical, the fermentation period is short, the production cost is low, so that the present fermentation process is suitable for large-scale popularization and production.

DESCRIPTION OF THE EMBODIMENTS

The technical solution of the present invention is further described below in conjunction with specific examples.

Example 1

A Quick Fermentation Method for *Cordyceps Militaris* Ferment in Combination with Complex Enzymatic Hydrolysis of Low-Ratio Cellulase/Pectinase After impurity removal, a dry sample of *Cordyceps militaris* was pulverized with a high-speed pulverizer, and screened with a 100-mesh sieve, to obtain a *Cordyceps militaris* powder; the *Cordyceps militaris* powder was dissolved with water at a ratio of 1:10, and stirred well with a high-speed homogenizer, to obtain a *Cordyceps militaris* slurry; 300 g of the *Cordyceps militaris* slurry was added with 150 g of brown sugar, and 550 g of distilled water were added to make up to 1 kg; the mixture was stirred thoroughly to completely dissolve the brown sugar; then pasteurization was performed for 10 min at 85° C., to obtain a *Cordyceps militaris* fermentation substrate; after the fermentation substrate was cooled to 40-45° C., the pH was adjusted to 4.80±0.10; 0.4% of cellulase and 0.60% of pectinase were added, 1 g of a compound lactic acid bacteria powder was inoculated, and complex enzymatic hydrolysis and lactic acid bacteria fermentation were carried out at the same time for 48 h at 40° C.; then, the enzymes were inactivated for 5 min in a water bath at 90° C.; after the lactic acid bacteria fermentation broth was cooled to 30° C., 1 g of fruit wine yeast activated with tenfold warm water was added, and fermentation was performed for 12 h at 28° C.; after the fermentation broth was subjected to centrifugation and filtration, xanthan gum and CMC-Na in a total amount of 1 g were added, where the compounding ratio of xanthan gum to CMC-Na was 2:1; and finally, the formulated fermentation broth was sterilized for 10 min at 100° C., then cooled to 85° C. and filled while the fermentation broth is hot, to obtain the *Cordyceps militaris* ferment.

The product flavor was analyzed through the detection by sense organs and an electronic nose. The obtained product had a strong taste of brown sugar and a clear and transparent red brown color and was palatably sweet and sour with a slight mellow aroma; the change of flavor components in the product fermentation process was analyzed using the electronic nose, which showed that compared with the fermentation broth only inoculated with lactic acid bacteria, as for the fermentation broth subjected to two-stage fermentation by lactic acid bacteria and yeast, the response value of S1 sensor (aromatic compounds) was increased by about 131%, and the response value of S5 sensor (terpenoids and esters) was increased by about 114%, indicating that the two-stage fermentation can achieve a better flavor of ferment.

The physicochemical indexes and functional components of the product were analyzed: the pH of the final product was 3.60±0.02, soluble solids accounted for about 15.6%, and the content of alcohol was less than 0.5 g/100 g; the content of cordycepin was 45.940±1.538 g/mL, and the preservation rate was about 77.68%, indicating that the fermentation process exerts a small influence on cordycepin and has a good preserving effect about cordycepin in the product; the scavenging rate of hydroxyl free radicals of the product was 79.27±0.94%; the reducing power of the ferment was measured using potassium ferricyanide, and the result showed that the absorbance of the product at 700 nm was 0.7396±0.0083, indicating that the product has strong reducing power and certain oxidation resistance.

Example 2

A Quick Fermentation Method for *Cordyceps Militaris* Ferment in Combination with Complex Enzymatic Hydrolysis of Equal-Ratio Cellulase/Pectinase After impurity removal, a dry sample of *Cordyceps militaris* was pulverized with a high-speed pulverizer, and screened with a 100-mesh sieve, to obtain a *Cordyceps militaris* powder; the *Cordyceps militaris* powder was dissolved with water at a ratio of 1:10, and stirred well with a high-speed homogenizer, to obtain a *Cordyceps militaris* slurry; 300 g of the *Cordyceps militaris* slurry was added with 150 g of brown sugar, and 550 g of distilled water were added to make up to 1 kg; the mixture was stirred thoroughly to completely dissolve the brown sugar; then pasteurization was performed for 10 min at 85° C., to obtain a *Cordyceps militaris* fermentation substrate; after the fermentation substrate was cooled to 40-45° C., the pH was adjusted to 4.80±0.10; 0.5% of cellulase and 0.5% of pectinase were added, 1 g of a compound lactic acid bacteria powder was inoculated, and complex enzymatic hydrolysis and lactic acid bacteria fermentation were carried out at the same time for 48 h at 40° C.; then, the enzymes were inactivated for 5 min in a water bath at 90° C.; after the lactic acid bacteria fermentation broth was cooled to 30° C., 1 g of fruit wine yeast activated with tenfold warm water was added, and fermentation was performed for 12 h at 28° C.; after the fermentation broth was subjected to centrifugation and filtration, xanthan gum and CMC-Na in a total amount of 1 g were added (the compounding ratio of xanthan gum to CMC-Na was 2:1); and finally, the formulated fermentation broth was sterilized for 10 min at 100° C., then cooled to 85° C. and filled while the fermentation broth is hot, to obtain the *Cordyceps militaris* ferment.

The product flavor was analyzed through the detection by sense organs and an electronic nose. The obtained product had a strong taste of brown sugar and a clear and transparent red brown color and was palatably sweet and sour with a slight mellow aroma; the change of flavor components in the product fermentation process was analyzed using the electronic nose, which showed that compared with the fermentation broth only inoculated with lactic acid bacteria, as for the fermentation broth subjected to two-stage fermentation by lactic acid bacteria and yeast, the response value of S1 sensor (aromatic compounds) was increased by about 136%, and the response value of S5 sensor (terpenoids and esters) was increased by about 128%, indicating that the two-stage fermentation can achieve a better flavor of ferment.

The physicochemical indexes and functional components of the product were analyzed: the pH of the final product was 3.54±0.02, soluble solids accounted for about 14.5%, and the content of alcohol was less than 0.5 g/100 g; the content of cordycepin in the final product was 58.808±0.116 g/mL, and the preservation rate was about 97.87%, indicating that the fermentation process exerts a tiny influence on cordycepin and has an excellent preserving effect about cordycepin in the product; the scavenging rate of hydroxyl free radicals of the product was 71.46±0.22%; the reducing power of the ferment was measured using potassium ferricyanide, and the result showed that the absorbance of the product at 700 nm is 0.8478±0.0056, indicating that the product has strong reducing power and certain oxidation resistance.

Example 3

A Quick Fermentation Method for *Cordyceps Militaris* Ferment in Combination with Complex Enzymatic Hydrolysis of High-Ratio Cellulase/Pectinase After impurity removal, a dry sample of *Cordyceps militaris* was pulverized with a high-speed pulverizer, and screened with a 100-mesh sieve, to obtain a *Cordyceps militaris* powder; the *Cordyceps militaris* powder was dissolved with water at a ratio of 1:10, and stirred well with a high-speed homogenizer, to obtain a *Cordyceps militaris* slurry; 300 g of the *Cordyceps militaris* slurry was added with 150 g of brown sugar, and 550 g of distilled water were added to make up to 1 kg; the mixture was stirred thoroughly to completely dissolve the brown sugar; then pasteurization was performed for 10 min at 85° C., to obtain a *Cordyceps militaris* fermentation substrate; after the fermentation substrate was cooled to 40-45° C., the pH was adjusted to 4.80±0.10; 0.6% of cellulase and 0.40% of pectinase were added, 1 g of a compound lactic acid bacteria powder was inoculated, and complex enzymatic hydrolysis and lactic acid bacteria fermentation were carried out at the same time for 48 h at 40° C.; then, the enzymes were inactivated for 5 min in a water bath at 90° C.; after the lactic acid bacteria fermentation broth was cooled to 30° C., 1 g of fruit wine yeast activated with tenfold warm water was added, and fermentation was performed for 12 h at 28° C.; after the fermentation broth was subjected to centrifugation and filtration, xanthan gum and CMC-Na in a total amount of 1 g were added (the compounding ratio of xanthan gum to CMC-Na was 2:1); and finally, the formulated fermentation broth was sterilized for 10 min at 100° C., then cooled to 85° C. and filled while the fermentation broth is hot, to obtain the *Cordyceps militaris* ferment.

The product flavor was analyzed through the detection by sense organs and an electronic nose. The obtained product had a strong taste of brown sugar and a clear and transparent red brown color and was palatably sweet and sour with a slight mellow aroma; the change of flavor components in the product fermentation process was analyzed using the electronic nose, which showed that compared with the fermentation broth only inoculated with lactic acid bacteria, as for the fermentation broth subjected to two-stage fermentation by lactic acid bacteria and yeast, the response value of S1 sensor (aromatic compounds) was increased by about 121%, and the response value of S5 sensor (terpenoids and esters) was increased by about 132%, indicating that the two-stage fermentation can achieve a better flavor of ferment.

The physicochemical indexes and functional components of the product were analyzed: the pH of the final product was 3.53±0.01, soluble solids accounted for about 14.9%, and the content of alcohol was less than 0.5 g/100 g; the content of cordycepin in the final product was 47.289±1.953 g/mL, and the preservation rate was 79.95%, indicating that the fermentation process exerts a small influence on cordycepin and has a good preserving effect about cordycepin in the product; the scavenging rate of hydroxyl free radicals of the product was 70.31±0.61%; the reducing power of the ferment was measured using potassium ferricyanide, and the result showed that the absorbance of the product at 700 nm is 0.8072±0.0027, indicating that the product has strong reducing power and certain oxidation resistance.

For a better description of the effect of performing enzymatic hydrolysis and primary fermentation at the same time, the following comparative example was added.

Comparative Example 1

Comparison of Effects of Performing Primary Fermentation in Combination with Enzymatic Hydrolysis Using Equal-Ratio Cellulase and Pectinase and Performing Enzymatic Hydrolysis and then Fermentation Refer to Example 2 for a method for performing primary fermentation in combination with enzymatic hydrolysis using equal-ratio cellulase and pectinase. Correspondingly, a method for preparing *Cordyceps militaris* ferment by enzymatic hydrolysis and then fermentation includes the following specific steps: after impurity removal, a dry sample of *Cordyceps militaris* was pulverized with a high-speed pulverizer, and screened with a 100-mesh sieve, to obtain a *Cordyceps militaris* powder; the *Cordyceps militaris* powder was dissolved with water at a ratio of 1:10, and stirred well with a high-speed homogenizer, to obtain a *Cordyceps militaris* slurry; the pH of the obtained *Cordyceps militaris* slurry was adjusted to 4.80±0.10; 0.5% of cellulase and 0.5% of pectinase were added, and enzymatic hydrolysis was carried out for 4 h in a water bath at 50° C.; after the enzymatic hydrolysis was finished, the enzymes were inactivated for 5 min in a water bath at 90° C.; 350 g of the *Cordyceps militaris* slurry subjected to the enzymatic hydrolysis was added with 150 g of brown sugar, and 500 g of distilled water were added to make up to 1 kg; the mixture was stirred thoroughly to completely dissolve the brown sugar; then pasteurization was performed for 10 min at 85° C., to obtain a *Cordyceps militaris* fermentation substrate; after the fermentation substrate was cooled to about 45° C., 1 g of a compound lactic acid bacteria powder was inoculated, and fermentation was performed for 48 h at 40° C.; then, 1 g of fruit wine yeast activated with tenfold warm water was added, and fermentation was performed for 12 h at 28° C., completing the fermentation; after the fermentation broth was subjected to centrifugation and filtration, xanthan gum and CMC-Na in a total amount of 1.5 g were added, where the compounding ratio of xanthan gum to CMC-Na was 2:1; and finally, the formulated fermentation broth was sterilized for 5 min at 100° C., then cooled to 85° C. and filled while the fermentation broth is hot, to obtain the *Cordyceps militaris* ferment by enzymatic hydrolysis and then fermentation. With respect to the process, the primary fermentation in combination with the enzymatic hydrolysis employed low-temperature and long-time enzymatic hydrolysis, namely, 48 h of enzymatic hydrolysis at 40° C., which was different from the high-temperature and short-time enzymatic hydrolysis, namely, 4 h of enzymatic hydrolysis at 50° C. in the method of enzymatic hydrolysis and then fermentation.

By employing the primary fermentation in combination with the enzymatic hydrolysis, the obtained ferment had a richer flavor, and the electronic nose had a greater response value. Compared with the method of enzymatic hydrolysis and then fermentation, the response values of two representative sensors, S1 (representing aromatic compounds) and S5 (representing terpenoids and esters), were increased by about 36% and about 33% respectively.

The final products of the two methods did not differ much with respect to the pH and soluble solids, and the content of alcohol was also less than 0.5 g/100 g. However, in the ferment product prepared by enzymatic hydrolysis and then fermentation, the content of cordycepin was 56.159±0.014 mg/L, which was reduced by about 18% compared to the content of cordycepin in the product of primary fermentation in combination with enzymatic hydrolysis; the scavenging rate of hydroxyl free radicals was 59.58±0.69%, which was reduced by about 17% compared to the scavenging rate of the product of primary fermentation in combination with enzymatic fermentation; and the reducing power of the ferment was measured using potassium ferricyanide, and the result showed that the absorbance of the ferment at 700 nm was 0.6177±0.0086, which was reduced by about 18% compared to the reducing power of the product of primary fermentation in combination with enzymatic fermentation.

It can be seen from the above results that by performing enzymatic hydrolysis and primary fermentation at the same time, the pretreatment time for enzymatic hydrolysis is saved, the flavor of the ferment product can be improved, the content of cordycepin in the ferment is increased, and the oxidation resistance of the ferment is enhanced.

What is claimed is:
1. A method for preparing *Cordyceps militaris* ferment by two-stage fermentation and complex enzymatic hydrolysis, comprising the following steps:
   (1) preparation of a *Cordyceps militaris* powder and a *Cordyceps militaris* slurry: obtaining a dry sample of *Cordyceps militaris*, and then removing impurities from the dry sample of *Cordyceps militaris*; after removing the impurities from the dry sample of *Cordyceps militaris*, pulverizing *Cordyceps militaris* with a high-speed pulverizer at a motor speed of 34,000 r/min, and screening with a 100-mesh sieve to obtain the *Cordyceps militaris* powder; dissolving the *Cordyceps militaris* powder with water at a mass ratio of 1:(10-15), and intermittently stirring for 1-2 min with a high-speed homogenizer at a speed of 3,000-3,600 r/min to achieve uniform mixing and obtain the *Cordyceps militaris* slurry;
   (2) preparation of a *Cordyceps militaris* fermentation substrate: wherein based on a total mass of the *Cordyceps militaris* fermentation substrate, 30-40% of the total mass is the *Cordyceps militaris* slurry obtained in Step (1), 10-20% of the total mass is brown sugar as a carbon source for fermentation, and the rest being distilled water; and performing pasteurization treatment on the prepared *Cordyceps militaris* fermentation substrate;

(3) lactic acid bacteria fermentation in combination with complex enzymatic hydrolysis: cooling the pasteurized *Cordyceps militaris* fermentation substrate to 40-45° C., and adjusting the pH to 4.80-5.00 using a citric acid solution; wherein based on the total mass of the *Cordyceps militaris* fermentation substrate, adding 0.4-0.6% cellulase and 0.4-0.6% pectinase; inoculating 0.1-0.2% lactic acid bacteria on the fermentation substrate, and performing complex enzymatic hydrolysis and lactic acid bacteria fermentation at the same time at 40-45° C. for 36-48 h; and then inactivating the enzymes for 5-10 min in a water bath at 85-90° C. to obtain a fermentation broth;

(4) fruit wine yeast fermentation: cooling the fermentation broth obtained in Step (3) to 28-32° C., then inoculating 0.10-0.15% (w/w) of fruit wine yeast, and fermenting for 6-18 h at a constant temperature of 26-30° C.;

(5) centrifugation: centrifuging the *Cordyceps militaris* fermentation broth subjected to two-stage fermentation by the lactic acid bacteria and the fruit wine yeast for 10 min at 4,200 r/min, and then filtering to obtain a clear liquid;

(6) formulation: adding a stabilizer into the clear liquid obtained by the centrifugation of Step (5); and (7) sterilization and filling: sterilizing the formulated fermentation broth for 5-10 min at 95-100° C., cooling to 85-90° C., and filling in a pre-sterilized glass bottle while the fermentation broth is hot to obtain a *Cordyceps militaris* ferment product.

2. The method for preparing *Cordyceps militaris* ferment by two-stage fermentation and complex enzymatic hydrolysis according to claim 1, wherein in Step (2), temperature for the pasteurization is 80-90° C., and time for the pasteurization is 10-20 min.

3. The method for preparing *Cordyceps militaris* ferment by two-stage fermentation and complex enzymatic hydrolysis according to claim 1, wherein in Step (3), a concentration of the citric acid solution is 10% (w/w); an enzyme activity of the cellulase is 50,000 U/g, and an enzyme activity of the pectinase is 100,000 U/g; and an temperature for enzymatic hydrolysis is 40-50° C.

4. The method for preparing *Cordyceps militaris* ferment by two-stage fermentation and complex enzymatic hydrolysis according to claim 1, wherein in Step (3), an inoculation process of the lactic acid bacteria is finished in a super clean bench; the lactic acid bacteria is a fermented powder of probiotics comprising *Lactobacillus plantarum, Lactobacillus acidophilus, Bifidobacterium lactis, Lactobacillus casei* and *Bifidobacterium longum;* and a bacterial number for inoculating reaches 8 billion CFU/g, and a temperature for growth is 37-45° C.

5. The method for preparing *Cordyceps militaris* ferment by two-stage fermentation and complex enzymatic hydrolysis according to claim 3, wherein in Step (3), an inoculation process of the lactic acid bacteria is finished in a super clean bench; the lactic acid bacteria is a fermented powder of probiotics, comprising *Lactobacillus plantarum, Lactobacillus acidophilus, Bifidobacterium lactis, Lactobacillus casei* and *Bifidobacterium longum;* and a bacterial number for inoculating reaches 8 billion CFU/g, and a temperature for growth is 37-45° C.

6. The method for preparing *Cordyceps militaris* ferment by two-stage fermentation and complex enzymatic hydrolysis according to claim 1, wherein in Step (4), an inoculation process of the fruit wine yeast is finished in a super clean bench; the fruit wine yeast is a yeast powder for wine and fruit wine; and the fruit wine yeast is activated in warm water at 35-40° C. before use, and then the activated fruit wine yeast is inoculated into 26-30° C. of the cooled fermentation broth.

7. The method for preparing *Cordyceps militaris* ferment by two-stage fermentation and complex enzymatic hydrolysis according to claim 3, wherein in Step (4), an inoculation process of the fruit wine yeast is finished in a super clean bench; the fruit wine yeast is a yeast powder for wine and fruit wine; and the fruit wine yeast is activated in warm water at 35-40° C. before use, and then the activated fruit wine yeast is inoculated into 26-30° C. of the cooled fermentation broth.

8. The method for preparing *Cordyceps militaris* ferment by two-stage fermentation and complex enzymatic hydrolysis according to claim 4, wherein in Step (4), an inoculation process of the fruit wine yeast is finished in a super clean bench; the fruit wine yeast is yeast powder for wine and fruit wine; and the fruit wine yeast is activated in warm water at 35-40° C. before use, and then the activated fruit wine yeast is inoculated into 26-30° C. of the cooled fermentation broth.

9. The method for preparing *Cordyceps militaris* ferment by two-stage fermentation and complex enzymatic hydrolysis according to claim 1, wherein the stabilizer is a compound stabilizer of xanthan gum and sodium carboxymethyl cellulose CMC-Na, wherein a total addition amount of the stabilizer is 0.10-0.20% (w/w), and a compounding ratio of xanthan gum to CMC-Na is 2:1.

10. The method for preparing *Cordyceps militaris* ferment by two-stage fermentation and complex enzymatic hydrolysis according to claim 6, wherein the stabilizer is a compound stabilizer of xanthan gum and sodium carboxymethyl cellulose CMC-Na, wherein a total addition amount of the stabilizer is 0.10-0.20% (w/w), and a compounding ratio of xanthan gum to CMC-Na is 2:1.

11. The method for preparing *Cordyceps militaris* ferment by two-stage fermentation and complex enzymatic hydrolysis according to claim 2, wherein in Step (3), a concentration of the citric acid solution is 10% (w/w); an enzyme activity of the cellulase is 50,000 U/g, and an enzyme activity of the pectinase is 100,000 U/g; and an temperature for enzymatic hydrolysis is 40-50° C.

12. The method for preparing *Cordyceps militaris* ferment by two-stage fermentation and complex enzymatic hydrolysis according to claim 2, wherein in Step (3), an inoculation process of the lactic acid bacteria is finished in a super clean bench; the lactic acid bacteria is a fermented powder of probiotics comprising *Lactobacillus plantarum, Lactobacillus acidophilus, Bifidobacterium lactis, Lactobacillus casei* and *Bifidobacterium longum;* and a bacterial number for inoculating reaches 8 billion CFU/g, and a temperature for growth is 37-45° C.

13. The method for preparing *Cordyceps militaris* ferment by two-stage fermentation and complex enzymatic hydrolysis according to claim 2, wherein in Step (4), an inoculation process of the fruit wine yeast is finished in a super clean bench; the fruit wine yeast is a yeast powder for wine and fruit wine; and the fruit wine yeast is activated in warm water at 35-40° C. before use, and then the activated fruit wine yeast is inoculated into 26-30° C. of the cooled fermentation broth.

14. The method for preparing *Cordyceps militaris* ferment by two-stage fermentation and complex enzymatic hydrolysis according to claim 5, wherein in Step (4), an inoculation process of the fruit wine yeast is finished in a super clean bench; the fruit wine yeast is a yeast powder for wine and fruit wine; and the fruit wine yeast is activated in warm water at 35-40° C. before use, and then the activated fruit wine yeast is inoculated into 26-30° C. of the cooled fermentation broth.

15. The method for preparing *Cordyceps militaris* ferment by two-stage fermentation and complex enzymatic hydrolysis according to claim 2, wherein the stabilizer is a compound stabilizer of xanthan gum and sodium carboxymethyl cellulose CMC-Na, wherein a total addition amount of the stabilizer is 0.10-0.20% (w/w), and a compounding ratio of xanthan gum to CMC-Na is 2:1.

16. The method for preparing *Cordyceps militaris* ferment by two-stage fermentation and complex enzymatic hydrolysis according to claim 5, wherein the stabilizer is a compound stabilizer of xanthan gum and sodium carboxymethyl cellulose CMC-Na, wherein a total addition amount of the stabilizer is 0.10-0.20% (w/w), and a compounding ratio of xanthan gum to CMC-Na is 2:1.

17. The method for preparing *Cordyceps militaris* ferment by two-stage fermentation and complex enzymatic hydrolysis according to claim 7, wherein the stabilizer is a compound stabilizer of xanthan gum and sodium carboxymethyl cellulose CMC-Na, wherein a total addition amount of the stabilizer is 0.10-0.20% (w/w), and a compounding ratio of xanthan gum to CMC-Na is 2:1.

18. The method for preparing *Cordyceps militaris* ferment by two-stage fermentation and complex enzymatic hydrolysis according to claim 8, wherein the stabilizer is a compound stabilizer of xanthan gum and sodium carboxymethyl cellulose CMC-Na, wherein a total addition amount of the stabilizer is 0.10-0.20% (w/w), and a compounding ratio of xanthan gum to CMC-Na is 2:1.

* * * * *